Aug. 10, 1965   R. B. CUNNINGHAM   3,199,465
PELLETING MACHINE HAVING RESTRICTED PASSAGES
Filed May 31, 1963
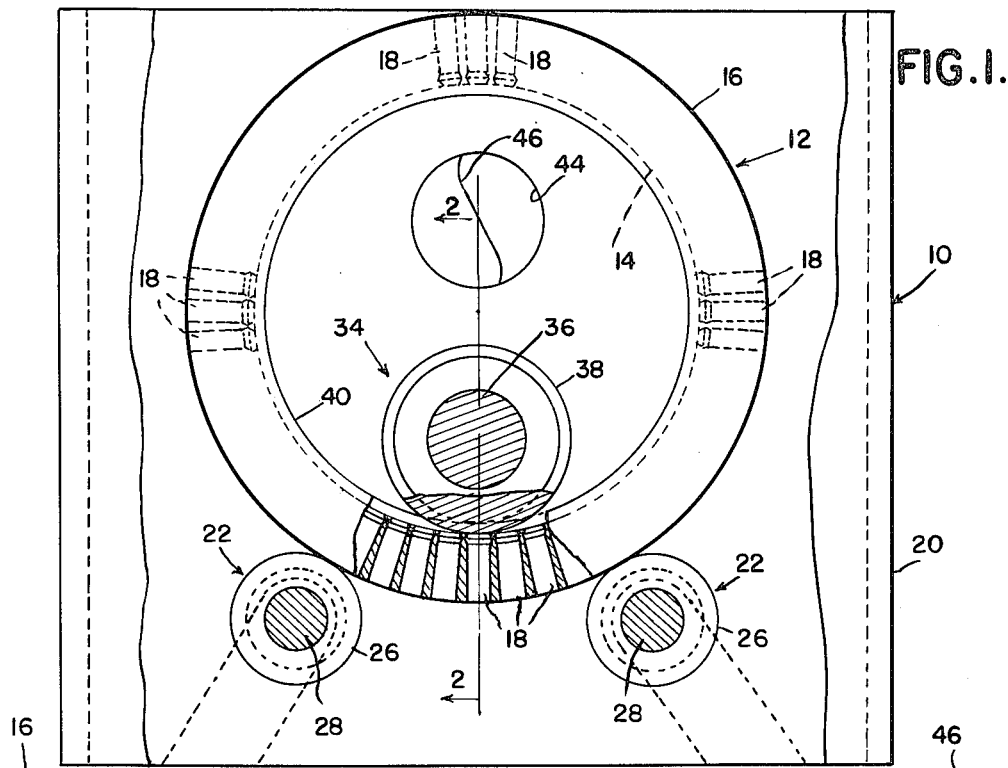
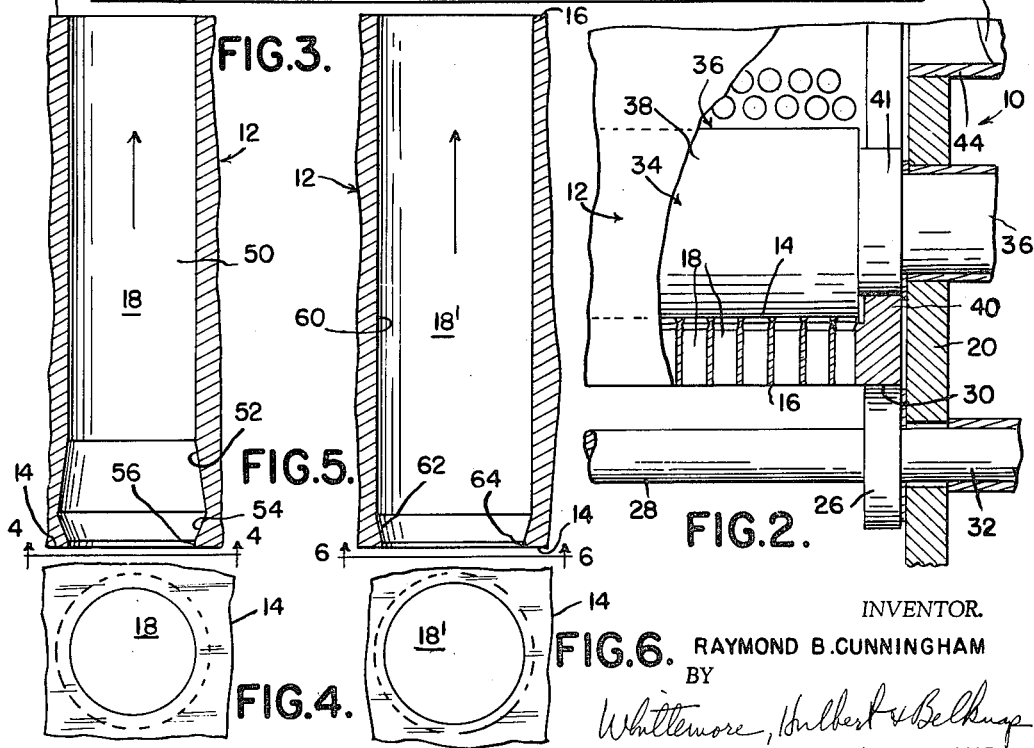
INVENTOR.
RAYMOND B. CUNNINGHAM
BY
Whittemore, Hulbert & Belknap
ATTORNEYS

United States Patent Office 3,199,465
Patented Aug. 10, 1965

3,199,465
PELLETING MACHINE HAVING RESTRICTED PASSAGES
Raymond B. Cunningham, Royal Oak, Mich., assignor to Cunningham & Sons, Chicago, Ill., a partnership
Filed May 31, 1963, Ser. No. 284,573
4 Claims. (Cl. 107—14)

This invention relates generally to a pelleting machine and refers more particularly to a machine having a plurality of passages through which crop material is extruded in a dense pellet or wafer form.

In a machine of this type, means are provided for squeezing the crop material through passages in a pelleting member. In the specific embodiment described hereinafter, a pressure roll turns on the inner surface of a pelleting ring to press the crop material into passages in the ring. The crop material builds up in tight layers and gradually extrudes from the discharge ends of the passages. It has been found that the crop material pressed into the passages tends to spring back and thus protrude beyond the charging ends of the passages at the inner surface of the ring. Then when the ring makes a complete revolution, the protruding inner ends of the pellets interfere with the pressure roll.

Accordingly, an essential object of this invention is to provide a machine which is designed to prevent springback of the pellets at the charging ends of the passages so that they will not protrude.

Another object is to provide a machine in which the passages themselves are so designed as to prevent springback of the pellet material.

Another object is to provide a machine in which the passages adjacent their charging ends are restricted to prevent spring-back.

Another object is to provide a machine wherein the passages adjacent their charging ends are frusto-conical to provide regions of reduced area.

Other objects and features of the invention will become apparent as the description proceeds, especially when taken in conjunction with the accompanying drawings, wherein:

FIGURE 1 is an elevational view, with parts in section, of a pelleting machine embodying my invention.

FIGURE 2 is a fragmentary side elevational view of the pelleting machine, with parts in section on the line 2—2 in FIGURE 1.

FIGURE 3 is an enlarged fragmentary sectional view showing one of the pellet passages.

FIGURE 4 is a fragmentary end view taken on the line 4—4 of FIGURE 3.

FIGURE 5 is similar to FIGURE 3, but shows a modification.

FIGURE 6 is a fragmentary end view taken on the line 6—6 of FIGURE 5.

Referring now more particularly to the drawing and especially to FIGURE 1–4, the machine there illustrated is generally indicated at 10 and includes a wafering ring 12 formed with concentric cylindrical radially inner and outer surfaces 14 and 16. The ring has passages 18 which extend radially from the inner surface 14 to the outer surface 16. The passages may be arranged in any pattern desired, and as shown are in staggered rows.

The ring 12 is supported for rotation on the housing 20, and for this purpose a pair of back-up rolls 22 are provided. Each back-up roll includes a pair of like circular discs 26 which are secured in axially spaced relation to a shaft 28. The shaft ends 29 are journalled in the housing 20. The discs 26 are spaced apart far enough to span the portion of the ring which has the passages and to engage the end surface extensions 30 of the ring. Only one disc is shown in FIGURE 2, but it will be understood that the other disc supports the opposite end of the ring in the same manner. The shafts 28 of the two back up rolls are parallel to the axis of the pelleting ring.

According to this construction, the two discs on each shaft 28 support the pelleting ring near its ends, and hence as will be seen in FIGURE 1 the back-up roll is cradled between the discs. The shafts 28 are free to rotate and obviously the pelleting ring can therefore also rotate.

Extending within the ring 12 on a parallel axis is a pressure roll 34 provided with spindles 36 journaled in bearings in the housing 20. The pressure roll has an enlarged central cylindrical portion 38 of a length corresponding to that portion of the pelleting ring having the passages. There is preferably a small clearance between the cylindrical portion 38 of the pressure roll and the opposed inner surface 14 of the ring.

An inlet tube 44 through the housing 20 opens into the space within the pelleting ring 12. A screw or auger 46 rotates in the inlet tube to feed the cut crop material into the ring.

Suitable means are provided to positively drive the pressure roll 36 and the pelleting ring 12. Preferably, the pressure roll is rotated at a speed such that the peripheral speed of the surface of its central portion 38 exceeds the peripheral speed of the radially inner surface 14 of the ring. The crop material is pressed into the passages 18 in layers through the inner charging ends of the passages at the inner surface 14 of the ring. The layers build up and cause a pellet of dense material to form within each passage and to extrude from the outer discharge ends of the passages beyond the outer surface 16 of the ring. The peripheral speed differential between the pressure roll and the ring provides a grinding action tending to chop the material into very small particles.

It has been found in practice that the crop material has a bit of springiness or spring-back after it is pressed into the passages by the pressure roll. The compressed material therefore tends to protrude inwardly from the charging ends of the passages, that is beyond the inner surface 14 of the ring. As a result, after the ring has made a complete revolution, the protruding inner ends of the pellets project far enough inwardly of the surface 14 of the ring to interfere with the pressure roll 36. This tends to jam the parts and requires considerably more power to rotate the pressure roll and ring. It is also hard on the bearings supporting the pressure roll and supporting the back-up rolls 22.

In order to prevent or minimize spring-back at the inner charging ends of the passages, the passages 18 are specially formed as shown particularly in FIGURE 3. These passages are all alike and are cylindrical, that is of uniform circular cross-section, from the outer discharge ends thereof throughout the major portion of their length. The cylindrical portion is designated 50. Extending from the inner end of the cylindrical portion 50 in a direction extending axially inwardly of each passage, there is a frusto-conical portion 52 which flares away from the axis of the passage. Extending from the inner large end of the frusto-conical portion 52 in a direction axially inwardly of the passage, there is a frusto-conical portion 54 which tapers toward the axis of the passage. At the very inner end of the passage, there is a cylindrical portion 56 concentric with the cylindrical portion 50. Hence there is a restriction in the passages 18 at or adjacent to their inner charging ends. The cylindrical portion 56 is restricted with respect to the gradually tapering frusto-conical surface 54. Hence the frusto-conical surfaces tapering to the restrictions at 56 prevents or greatly reduces the tendency of the crop material pressed into the inner charging ends of the passages from springing back. The direction of movement of the crop material as it builds up within the passage is indicated by the arrow in FIGURE 3.

FIGURES 5 and 6 illustrate a modification in which the passage 18′ is cylindrical, that is of uniform circular cross-section, from the outer discharge end throughout the major extent of its length. The cylindrical portion of the passage is designated 60. Adjacent the inner charging end of the passage 18′, there is a frusto-conical surface 62 which tapers to a smaller diameter in a direction axially inwardly of the passage from the inner end of the cylindrical portion. At the inner charging end of the passage there is a cylindrical portion 64 which connects with the small end of the frusto-conical surface 62. The restriction provided by the frusto-conical surface 62 leading to the cylindrical surface 64 prevents or greatly reduces spring-back of the crop material. It will be understood that a plurality of the passages 18′ may be substituted for the passages 18 in the pelleting machine shown in FIGURES 1–4.

When the pellets extrude beyond the discharge ends of the passages 18 or 18′ far enough, they are broken off by contact with one or the other of the shafts 28 and drop to the bottom of the machine where they are collected.

What I claim as my invention is:

1. In a machine for compressing and pelleting a cut crop, a pelleting ring having a circular series of passages therethrough, a pressure roll having an axis of rotation perpendicular to the axes of said passages, said roll being rotatable to traverse all of said passages and to charge the cut crop into the inner ends of said passages and force the same outwardly therethrough, said passages adjacent their inner charging ends having walls which taper radially and axially inwardly relative to the passage axes and also having walls which taper from the outer ends of said first-mentioned walls radially inwardly and axially outwardly relative to the passage axes.

2. In a machine for compressing and pelleting a cut crop, a pelleting ring having a circular series of passages therethrough, a pressure roll having an axis of rotation perpendicular to the axes of said passages, said roll being rotatable to traverse all of said passages and to charge the cut crop into the inner ends of said passages and force the same outwardly therethrough, said passages adjacent their inner charging ends having frusto-conical walls which taper radially and axially inwardly relative to the passage axes and also having frusto-conical walls tapering from the outer ends of said first-mentioned walls radially inwardly and axially outwardly relative to the passage axes.

3. In a machine for compressing and pelleting a cut crop, a pelleting ring having a circular series of passages therethrough, a pressure roll having an axis of rotation perpendicular to the axes of said passages, said roll being rotatable to traverse all of said passages and to charge the cut crop into the inner ends of said passages and force the same outwardly therethrough, said passages being of uniform cross-sectional area from their outer ends throughout the major extent of their length and adjacent their inner charging ends having walls which taper from the inner ends of the portions of said passages of uniform cross-sectional area radially and axially inwardly relative to the passage axes.

4. In a machine for compressing and pelleting a cut crop, a pelleting ring having a circular series of passages therethrough, a pressure roll having an axis of rotation perpendicular to the axes of said passages, said roll being rotatable to traverse all of said passages and to charge the cut crop into the inner ends of said passages and force the same outwardly therethrough, said passages being of uniform cross-sectional area from their outer ends throughout the major extent of their length and adjacent their inner ends having frusto-conical walls which taper radially outwardly and axially inwardly relative to the passage axes from the inner ends of the portions of said passages of uniform cross-sectional area, said passages also having frusto-conical walls which taper from the inner ends of said first-mentioned frusto-conical walls radially and axially inwardly relative to the passage axes.

References Cited by the Examiner

UNITED STATES PATENTS

| 2,757,621 | 8/56 | Johnson | 107—14 |
| 2,957,203 | 10/60 | Marshall. | |
| 2,958,099 | 11/60 | Chisholm et al. | 18—12 |
| 2,984,173 | 5/61 | Roche et al. | 100—93 |

FOREIGN PATENTS

| 205,253 | 1/57 | Australia. |
| 315,772 | 11/19 | Germany. |
| 26,750 | 11/11 | Great Britain. |

WALTER A. SCHEEL, *Primary Examiner.*